C. M. EASON AND R. O. HENDRICKSON.
DIFFERENTIAL GEARING.
APPLICATION FILED NOV. 11, 1916.
1,315,217.
Patented Sept. 9, 1919.
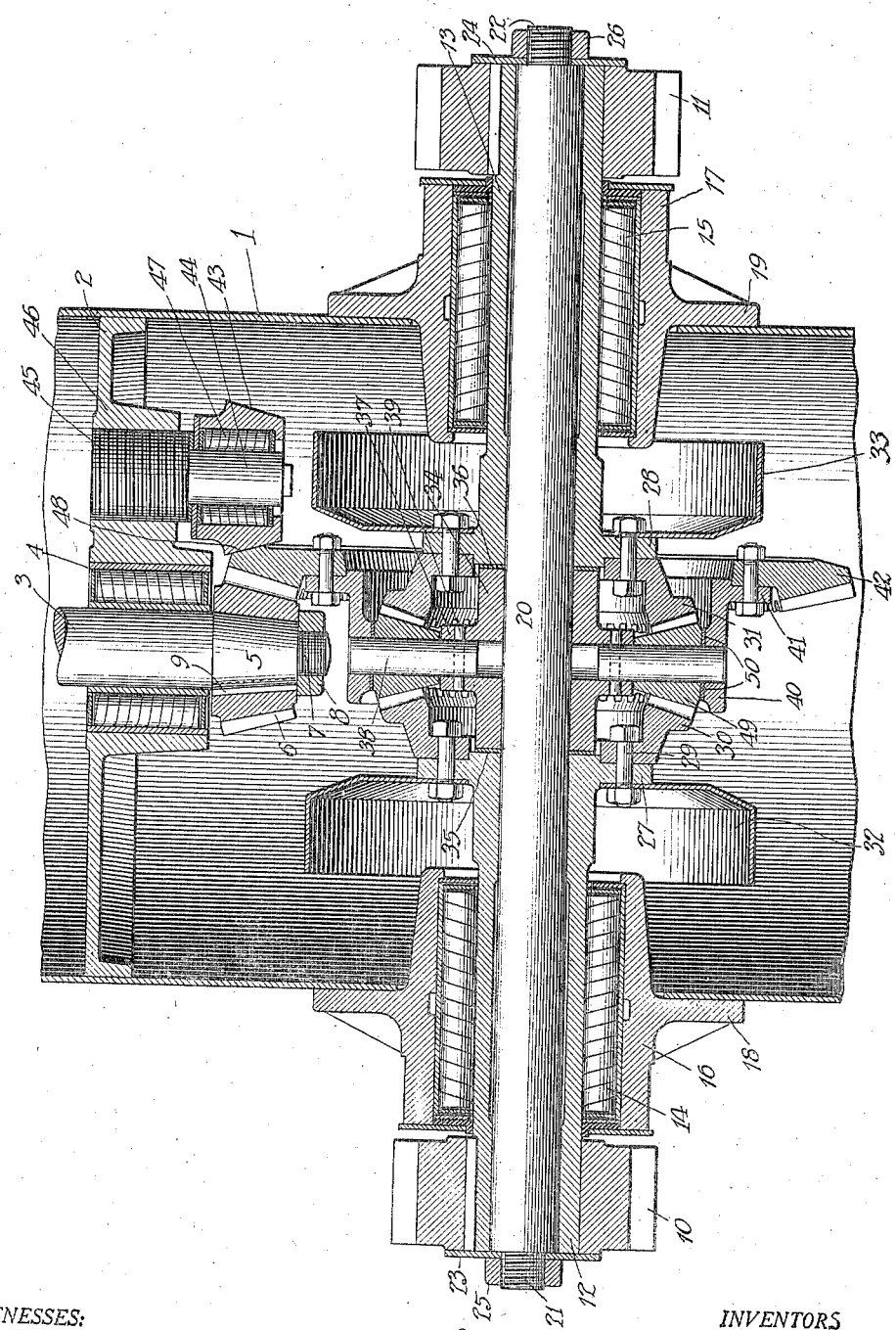
WITNESSES:
Martin H. Olsen.
Robert Dobberman
INVENTORS
Clarence M. Eason and
Robert O. Hendrickson
BY
ATTORNEYS.

UNITED STATES PATENT OFFICE.

CLARENCE M. EASON, OF CHICAGO, ILLINOIS, AND ROBERT O. HENDRICKSON, OF RACINE, WISCONSIN, ASSIGNORS TO WALLIS TRACTOR COMPANY, OF RACINE, WISCONSIN, A CORPORATION OF WISCONSIN.

DIFFERENTIAL GEARING.

1,315,217.     Specification of Letters Patent.     Patented Sept. 9, 1919.

Original application filed November 1, 1913, Serial No. 798,687. Divided and this application filed November 11, 1916. Serial No. 130,924.

*To all whom it may concern:*

Be it known that we, CLARENCE M. EASON and ROBERT O. HENDRICKSON, residing, respectively, at Chicago, in the county of Cook and State of Illinois, and Racine, in the county of Racine and State of Wisconsin, have invented certain new and useful Improvements in Differential Gearings, of which the following is a specification.

Our invention is designed more particularly for use in connection with traction engines, and in the accompanying drawing is shown in connection with such a device, but it is likewise applicable to motor vehicles of other classes and designs.

In the drawing we have shown and in the following specification described in detail a preferred embodiment of our invention. It is to be understood, however, that the specific disclosure is for the purpose of exemplification only, and that the scope of our invention is defined in the following claim, in which we have endeavored to distinguish it from the prior art so far as known to us, without, however, relinquishing or abandoning any portion or feature thereof.

The drawing is a horizontal section of so much of a tractor as is necessary to an understanding of our invention, showing the latter as applied thereto.

While our invention is applicable to other forms of tractors, we have shown it as applied to one of the constructions disclosed in our application No. 798,687 filed November 1, 1913, of which the present application is a division. For the present purpose it is sufficient to understand that the body or frame of the tractor consists of or comprises a shell 1 of sheet metal preferably curved in transverse section. At suitable intervals the body 1 is provided with transverse supporting plates 2, one of which is shown in the drawing, which serve not only to brace the body but to support certain portions of the mechanism therein. The partition 2 shown supports one end of the engine crank shaft 3 which is journaled therein in a roller bearing 4 of a known type, and carries at its end 5 a bevel pinion 6 which is secured to said shaft in any suitable manner, as for example by beveling the end of the shaft and the bore of the pinion correspondingly, threading the reduced end of the shaft at 7 to receive a nut 8 and keying the pinion to the shaft at 9. The bull pinions 10, 11, are keyed or otherwise secured upon hollow countershafts 12, 13, which are journaled in roller bearings 14, 15, in flanged housings 16, 17, secured to the opposite walls of the body by the flanges 18, 19. The continuous transverse shaft 20 extends through the hollow countershafts 12, 13, and is reduced at its ends 21, 22 and threaded for the reception of washers 23, 24 and nuts 25, 26, the washers bearing against the outer faces of the bull pinions to take up the lateral pressure on said pinions, and the hollow shafts and transmit it to the shaft 20.

The inner ends of the respective countershafts 12, 13, are formed with flanges 27, 28 to which are bolted by the bolts 29, the crown gears 30, 31, as well as the brake sheaves or pulleys 32, 33. The latter have nothing to do with the invention which forms the subject-matter of this application, and therefore need not be further described.

Between the inner ends of the countershafts a spider 34 is journaled upon the shaft 20, the ends of the hubs of said spider being spaced from the ends of the countershafts by washers 35, 36. The spider is further formed with a series of radial bosses 37 which may be four in number and perforated to support stub shafts 38 secured in the perforations of said bosses by pins 39. The outer ends of said stub shafts are secured in an annulus 40 which is concentric with the shaft 20 and is formed with a plane flange 41 projecting from one edge thereof. An annular bevel-gear 42 is attached to said flange in such position as to engage the bevel-gear 6 and be rotated thereby. An antifriction roll 43 is mounted to bear upon the rear face of the annular bevel-gear to support the same against the lateral pressure of the gear 6, the roller for this purpose being mounted upon a stub shaft 44 which is adjustable toward and from the shaft 20 by its threaded engagement 45 with an opening in boss 46 of supporting plate 2. Roller bearings 47 are interposed between the stub shaft 44 and friction roll 43, roll 43 being beveled as shown and engaging a similarly beveled surface 48 on the back of the crown gear. Axial adjustment of said roll by the means heretofore described serves to adjust the annular gear into proper engagement with the gear 6 and to take up wear between said gears. Obviously the rotation of the shaft 3 by the engine rotates the annular gear and thereby the spider about its bearing on the shaft 20.

Between the opposite crown gears 30, 31, and meshing therewith a series of bevel-pinions 49 are mounted upon the stub shafts 38, the length of such pinions being just sufficient with the aid of the interposed washers 50 to maintain the annulus 40 concentric with the shaft 20. The operation of mechanism of this character is so familiar that description thereof seems unnecessary. The rotation of the spider normally drives the crown gears and the bull pinions at the same speed providing, however, for relative rotation between said bull pinions as when the machine is moving in a curve, by means of the gear pinions engaging the crown gears.

It will be understood that in our improved construction the lateral thrust of the gear pinions upon the crown gears is all transmitted to the tension shaft or tie-bar 20, so that none of it is borne by the frame of the machine or the mountings of the countershaft. The only lateral strain therefore which need be supported by the bearings or frame work is that due to the thrust of the bevel-pinion 6 upon the annular gear 42, and this is all received and supported by the roller 43, which is substantially mounted in the cross-head 46.

We claim:

In a device of the class described, a pair of oppositely arranged coaxial bearings, hollow countershafts mounted in said bearings, a tension shaft extending through the countershafts, abutments on the tension shaft with which the ends of said countershafts engage to transmit the axial pressure of said countershafts to the tension shaft, gears on the adjacent ends of the countershafts, a series of pinions engaging the gears on the countershafts, a support for said pinions, an annular gear mounted on said support, a driving gear engaging said annular gear for revolving the same, and a friction roll having a tapered periphery engaging the annular gear to support the same against the pressure of the driving gear, and means for axially adjusting the friction roll.

CLARENCE M. EASON.
ROBERT O. HENDRICKSON.